(12) United States Patent
Hueniken et al.

(10) Patent No.: US 6,505,614 B1
(45) Date of Patent: Jan. 14, 2003

(54) CONNECTION FORMED BY ENGAGEMENT OF A TUBE AND A VALVE SURFACE

(75) Inventors: Peter Hueniken, Chatham (CA); Robert Faulkner, Chatham (CA); Michael Liddle, Wheatley (CA)

(73) Assignee: Siemens Canada Limited (CA)

( * ) Notice: Subject to any disclaimer, the term of this patent is extended or adjusted under 35 U.S.C. 154(b) by 0 days.

(21) Appl. No.: 09/689,897

(22) Filed: Oct. 13, 2000

Related U.S. Application Data

(60) Provisional application No. 60/159,397, filed on Oct. 14, 1999.

(51) Int. Cl.[7] ............................................. F02M 25/07
(52) U.S. Cl. .............................. 123/568.11; 123/568.27
(58) Field of Search ....................... 123/568.11, 568.12, 123/568.13, 568.16, 568.17, 538.18, 568.21, 268.27, 568.29; 285/222, 286.2, 302; 29/505; 403/274

(56) References Cited

U.S. PATENT DOCUMENTS

| | | | |
|---|---|---|---|
| 1,779,712 A | * 10/1930 | Poeppel | |
| 4,036,514 A | * 7/1977 | Hannover | 285/222 |
| 4,214,781 A | 7/1980 | Joseph | 285/222 |
| 4,349,003 A | 9/1982 | Masuda | 123/568.29 |
| 4,566,423 A | * 1/1986 | Kenny et al. | 123/568.27 |
| 5,056,704 A | 10/1991 | Martin et al. | 228/173.4 |
| 5,207,461 A | * 5/1993 | Lasko | 285/222 |
| 5,366,006 A | * 11/1994 | Lu et al. | 285/382 |
| 5,564,756 A | * 10/1996 | Hamilton | 285/222 |
| 5,613,479 A | * 3/1997 | Gates et al. | 123/568.27 |
| 5,785,119 A | * 7/1998 | Watanabe et al. | 285/222 |
| 5,863,081 A | * 1/1999 | Katayama et al. | 285/222 |
| 5,893,589 A | * 4/1999 | Bleitz et al. | 285/382 |

FOREIGN PATENT DOCUMENTS

EP 0 599 103 A1 6/1994

* cited by examiner

Primary Examiner—Willis R. Wolfe

(57) ABSTRACT

A connection provides a fluid tight communication between a valve and a tube. The valve includes a first surface, a second surface, and an aperture extending through the valve between the first and second surfaces. The tube includes an end portion terminating at an edge. The end portion penetrates the first surface, extends through the aperture, and is deformed so as to engage the second surface.

19 Claims, 6 Drawing Sheets

CONNECTION FORMED BY ENGAGEMENT OF A TUBE AND A VALVE SURFACE

CROSS-REFERENCE TO RELATED APPLICATIONS

This application claims the benefit of the earlier filing date of U.S. Provisional Application No. 60/159,397, filed Oct. 14, 1999, the disclosure of which is incorporated by reference herein in its entirety.

BACKGROUND OF THE INVENTION

The present invention relates to a connection between a tube and a valve, and more particularly between a differential pressure tube and an exhaust gas recirculation (EGR) valve in an EGR assembly. The connection is formed by deforming an end portion of the tube so as to engage an internal cylindrical surface of the valve.

A variety of methods are known to secure a tube to an EGR valve in a conventional EGR assembly. It is well known, for example, to use additional components or secondary operations (e.g., silver soldering, brazing, screw and locking tab features, etc.) However, these methods are often expensive and time consuming to construct. Consequently, both the cost and the assembly time of the EGR assembly are increased.

For these reasons, it is desirable to eliminate these additional components and secondary steps in the assembly process of the EGR assembly.

SUMMARY OF THE INVENTION

The present invention includes a connection for communicating a fluid. The connection comprises a valve and a tube. The valve includes a first surface, a second surface, and an aperture extending through the valve between the first and second surfaces. The tube includes an end portion terminating at an edge. The end portion penetrates the first surface and extends through the aperture. The end portion is deformed to engage the second surface.

The present invention also includes a connection for communicating exhaust gas. The connection comprises an exhaust gas recirculation valve assembly and a differential pressure tube. The exhaust gas recirculation valve assembly has an exterior surface and an interior surface defining a cavity, and has an aperture extending between the interior and exterior surfaces. The differential pressure tube has an end portion terminating at an edge. The end portion penetrates the exterior surface, extends through the aperture, and is deformed so as to engage the interior surface.

The present invention also includes a method of connecting a tube to a valve. The tube includes an end portion terminating at an edge. The valve includes a first surface, a second surface, and an aperture extending through the valve between the first and second surfaces. The method comprises arranging the end portion to penetrate the first surface and to extend through the aperture; and deforming the end portion to contiguously engage the second surface.

These connections are well suited to withstand exhaust gas temperatures, engine vibrations, and the engine environment without loosening, rotating, or leaking.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain features of the invention.

DETAILED DESCRIPTION OF THE PREFERRED EMBODIMENTS

Figure 2:
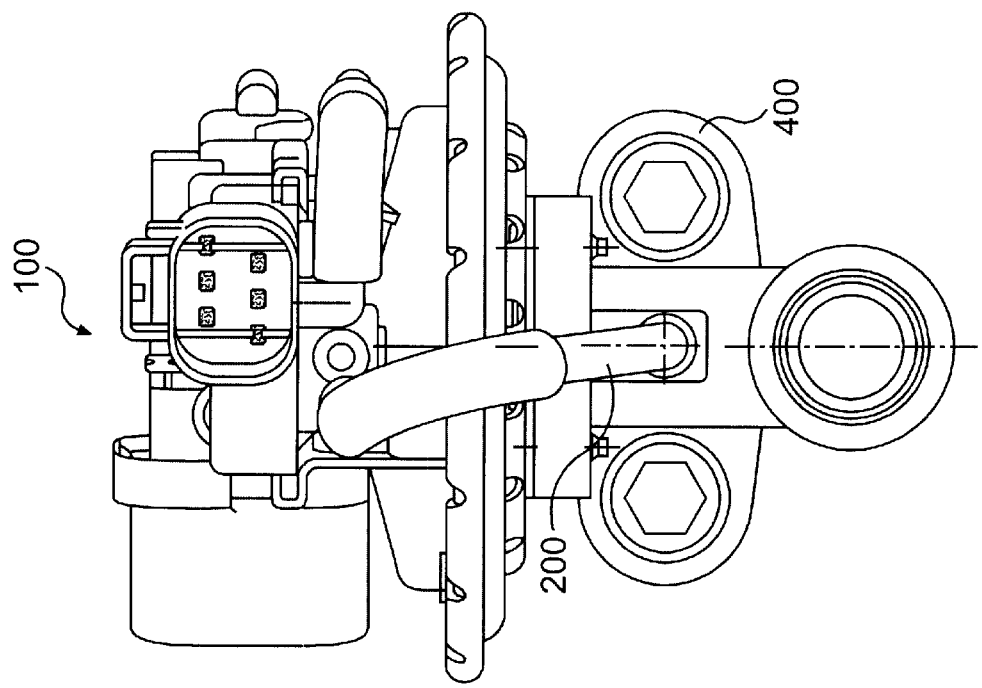
FIG. 2 is a front view of the EGR assembly of FIG. 1.
Figure 1:
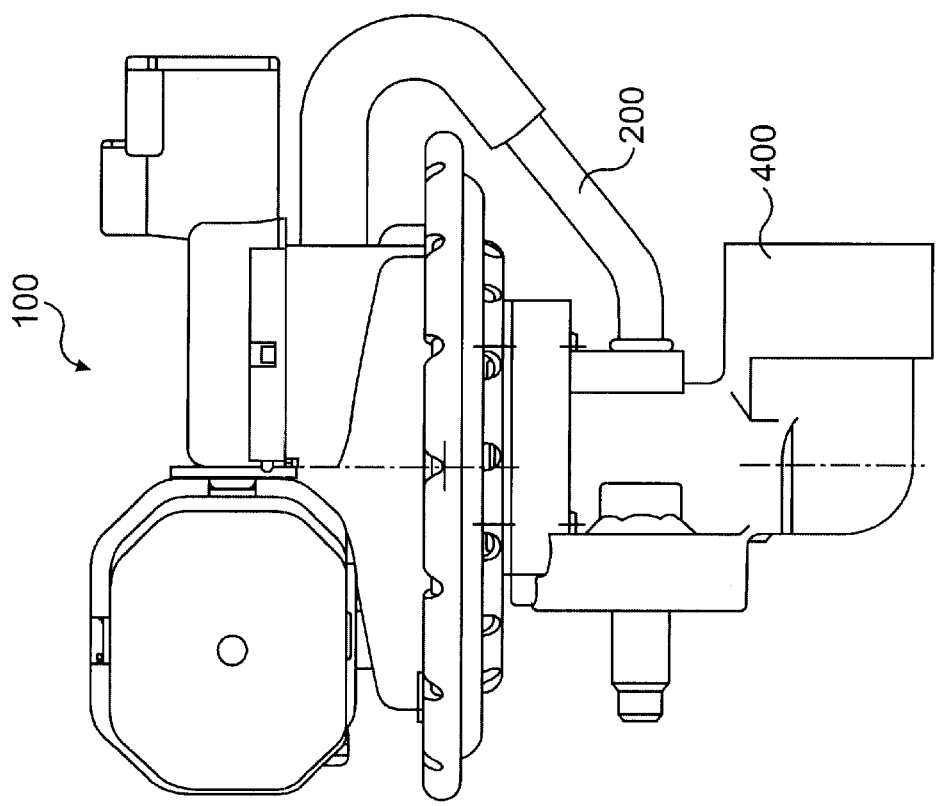
FIG. 1 is a side view of an EGR assembly according to the present invention.
Figure 3:
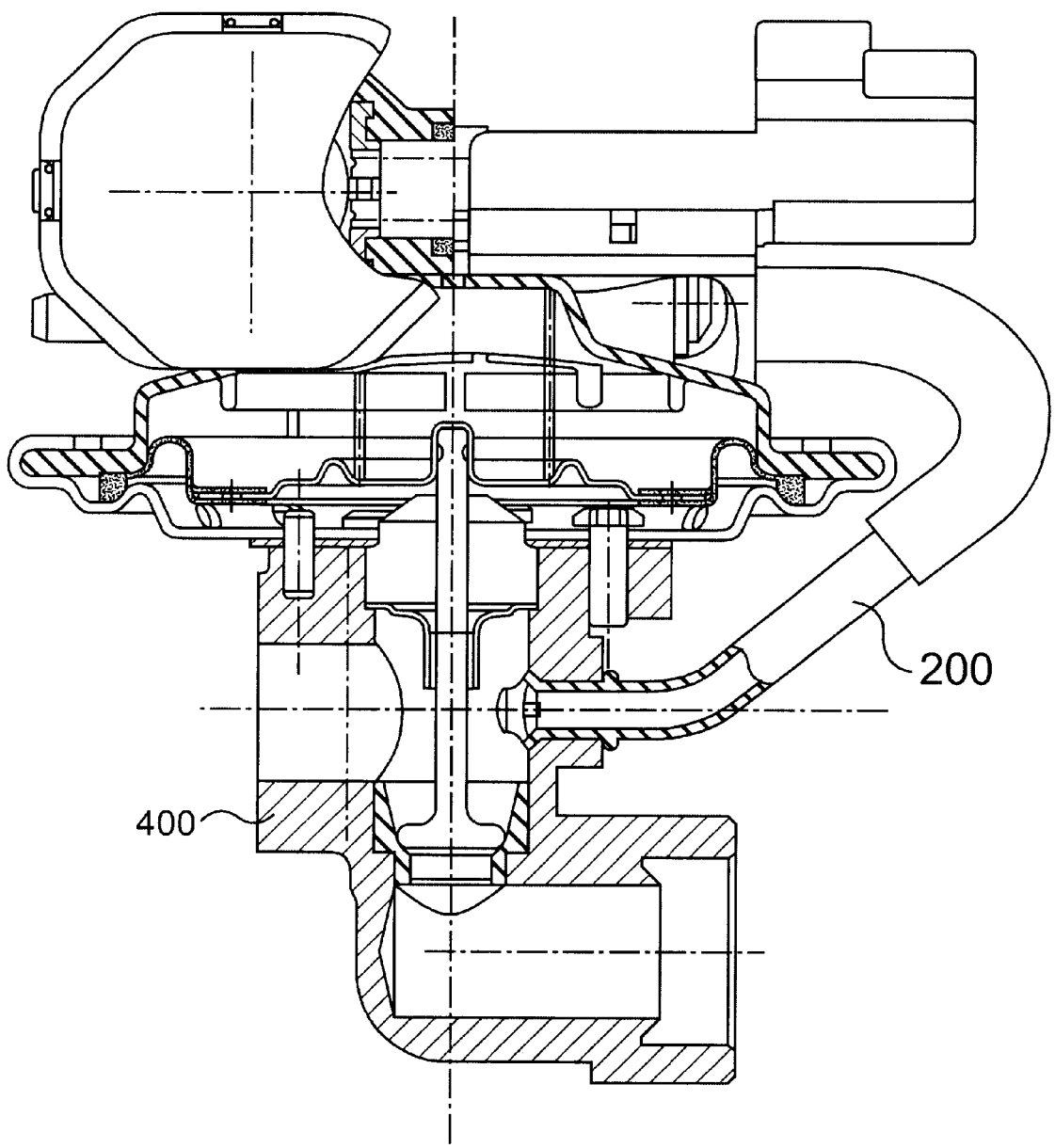
FIG. 3 is a partial cross-sectional view of the EGR assembly of FIG. 1.
Figure 10:
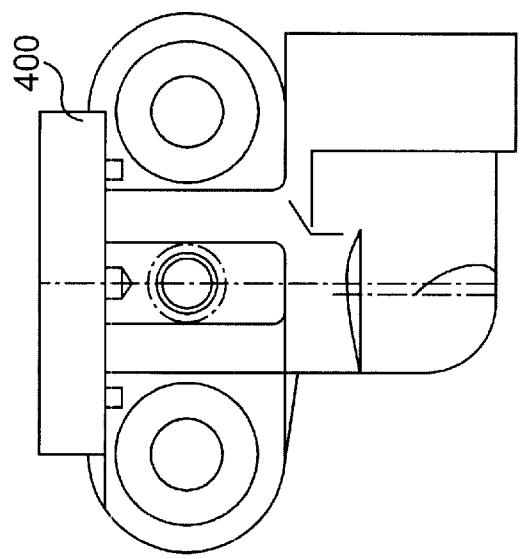
FIG. 10 is a back view of the EGR valve of FIG. 5.
Figure 7:
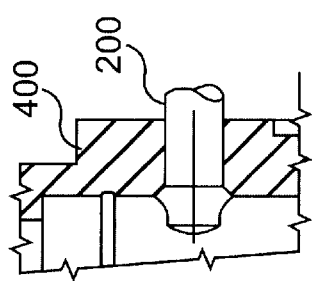
FIG. 7 is a detail view of the EGR assembly of FIG. 1.
Figure 4:
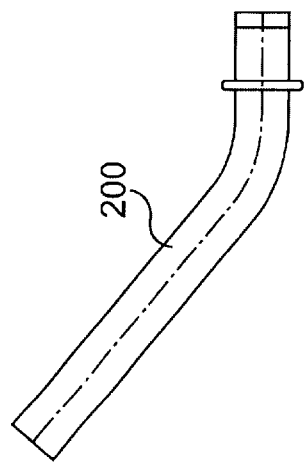
FIG. 4 is a side view of an exhaust tube according to the present invention.
Figure 5:
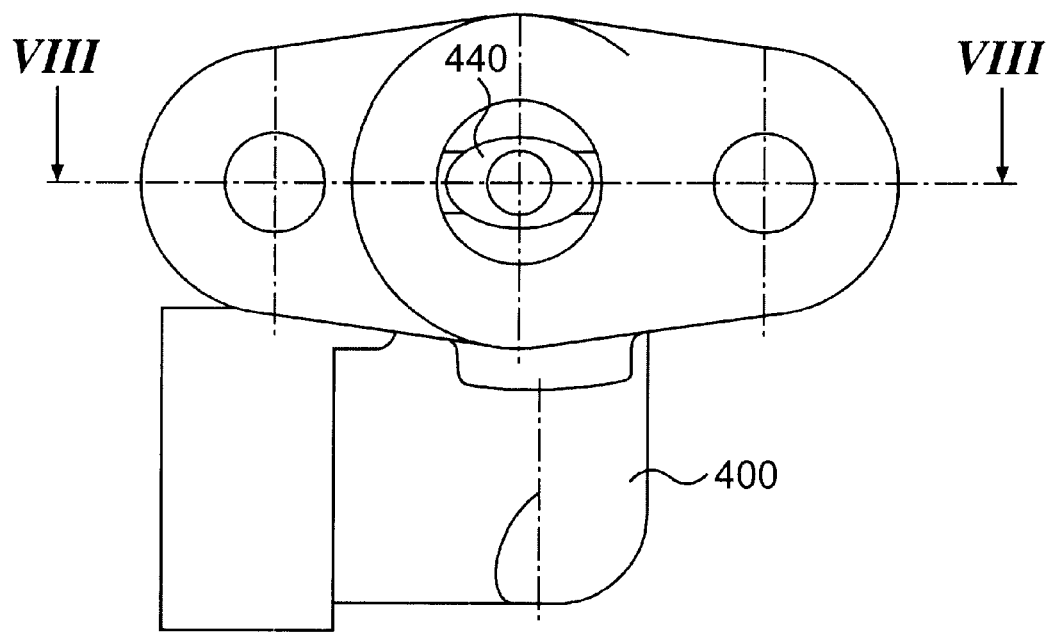
FIG. 5 is an interior view of an EGR valve of the EGR assembly of FIG. 1.
Figure 6:
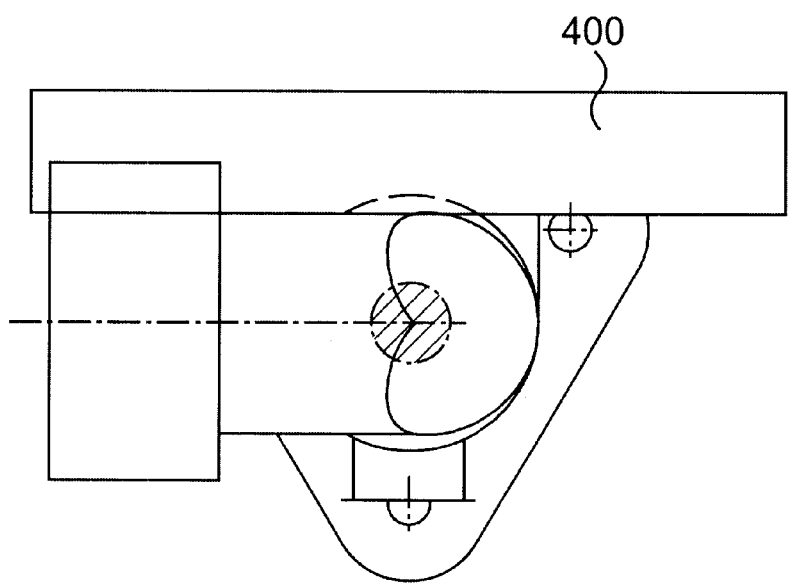
FIG. 6 is a bottom view of the EGR valve of FIG. 5.
Figure 8:
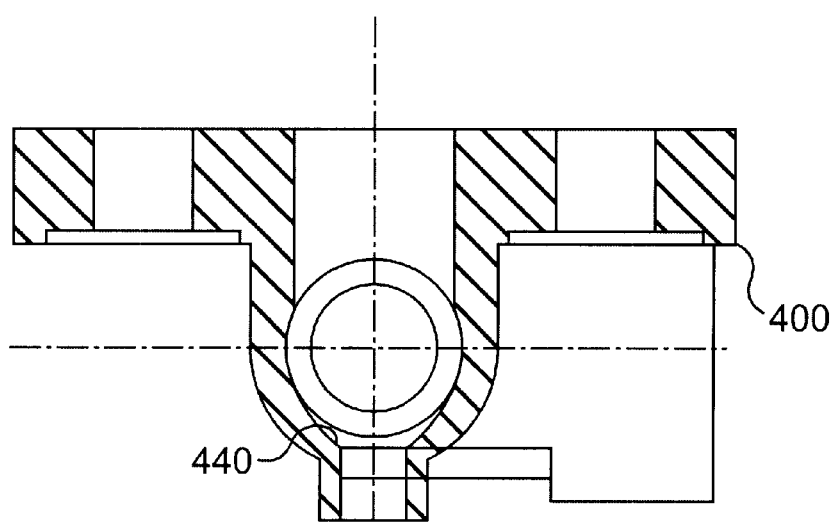
FIG. 8 is a cross-sectional view taken along line VIII—VIII in FIG. 5.
Figure 9:
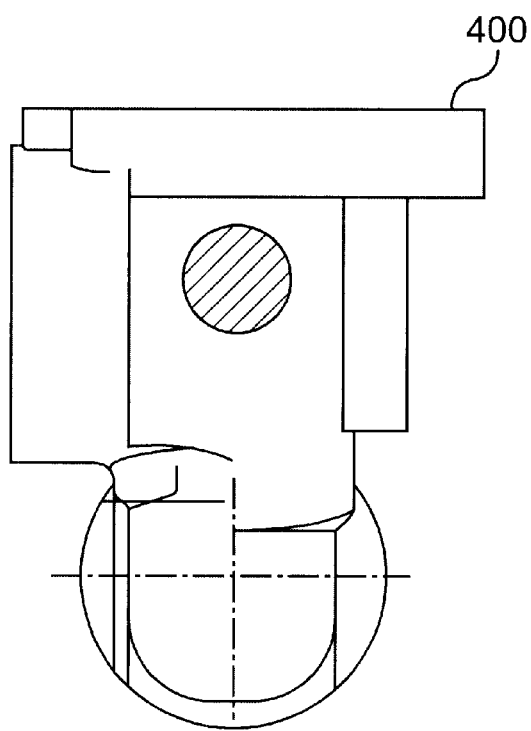
FIG. 9 is a front view of the EGR valve of FIG. 5.

Referring to the figures, an example of a connection for communicating exhaust gas or other fluid according to the present invention is shown. Although the connection is illustrated in an exhaust gas recirculation (EGR) assembly, it is understood that the connection is not limited to use in an EGR assembly.

As illustrated in the drawings, the EGR assembly 100 includes a differential pressure tube 200 and an EGR valve 400.

The tube 200 includes an end portion 210 terminating at an annular edge 212. A taper can be formed on the annular portion 210 to facilitate alignment of the tube 200 and the valve 400. For example, the taper can be a chamfer of about 10.5 degrees terminating at the edge 212. Further, a flange 220 can be used to limit the insertion of the end portion 210 into the valve 400. The tube 200 can be fabricated of stainless steel.

The valve 400 includes an aperture 410 extending between a first surface 420 and a second surface 430. The aperture 410 is appropriately sized and shaped to receive the end portion 210. A friction or interference-type fit of about 0.1 mm between the aperture 410 and the end portion 210 can be used to aid in securing the tube 200 and the valve 400. The aperture 410 can also be tapered to aid in construction of the EGR assembly 100. For example, the taper can be about 2 degrees and can also include a chamfer of about 0.5 inches by 45 degrees. The end portion 210 can be inserted into the aperture 410 until the flange 220 contiguously engages the first surface 420.

At least one of the first and second surfaces, 420, 430, can be generally cylindrical or can be generally flat. A cylindrical second surface 430 results in a saddle-shape, indicated as 440 in the figures, at an intersection of this surface and the aperture 410. The saddle 440 can have a taper, and the taper can include a chamfer.

The lengths of the end portion 210 and the aperture 410 are determined such that when the end portion 210 penetrates the first surface 420 and extends through the aperture 410, the end portion 210 also extends beyond the second surface 430 into the interior of the valve 400.

Figure 12:
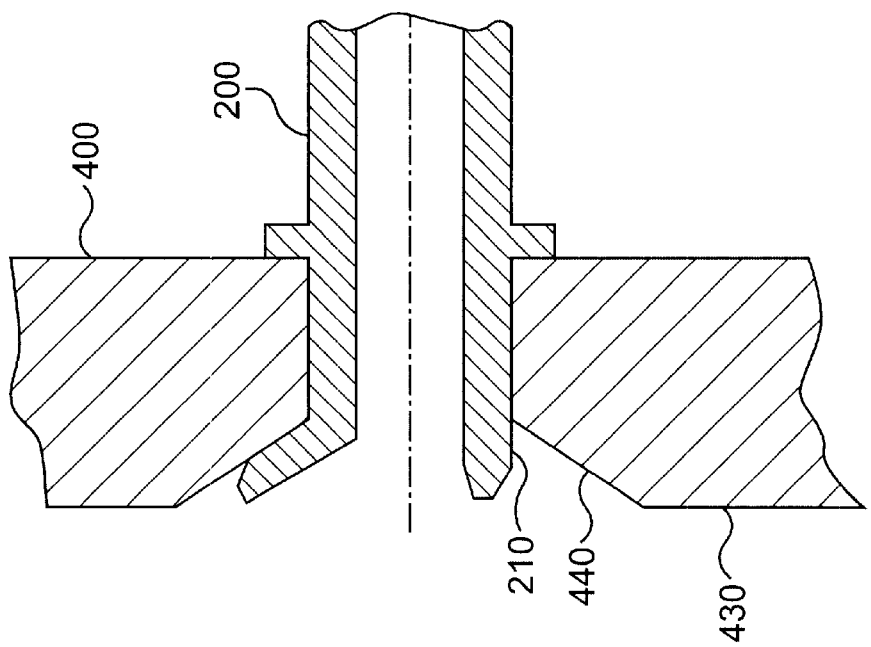
FIG. 12 is a detail side cross-sectional view of the EGR assembly according to the present invention after formation of the connection. The top half of this figure shows a portion of the exhaust tube that is staked and the bottom half of this figure shows a portion of the exhaust tube that is not staked.
Figure 11:
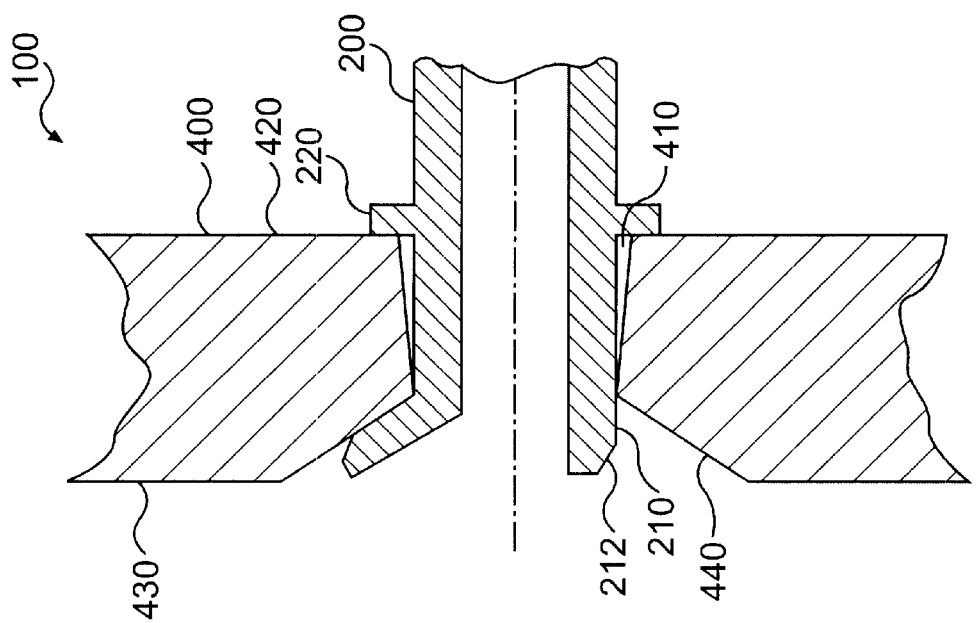
FIG. 11 is a detail side cross-sectional view of an EGR assembly according to the present invention before formation of the connection. The top half of this figure shows a portion of the exhaust tube that is staked and the bottom half of this figure shows a portion of the exhaust tube that is not staked.

As shown in FIG. 12, the end portion 210 is deformed to engage the second surface 430, thereby forming a connection between the tube 200 and the valve 400. The end portion 210 can be deformed at one point, or can be deformed at a plurality of points. The end portion 210 can be deformed at equiangular intervals. For example, the end portion 210 can be deformed at four points, arranged at equally spaced intervals, e.g., 90 degree angles, around the longitudinal axis of the tube 200. The end portion 210 can be deformed to contiguously engage the second surface 430. For example, the end portion 210 can be deformed to contiguously engage the saddle 440, and can more specifically be deformed to contiguously engage the taper or chamfer of the saddle 440. The end portion 210 can be deformed at a point aligned along a minor axis of the saddle 440 to further prevent rotation of the tube 200 relative to the valve 400 during use of the EGR assembly 100.

Deformation of the end portion 210 can be accomplished by a staking process. A staking tool having a cruciform tip that is similar in geometry to a Phillips screwdriver can be used. The tip of the staking tool can include a first pair of elongate staking surfaces that are longer than and perpendicular to a second pair of staking surfaces. The first pair of staking surfaces can be aligned along one of the major and minor axis of the saddle 440, thereby further securing the tube 200 relative to the valve 400.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A connection for communicating a fluid, the connection comprising:
    a valve including a first surface, a second surface, and an aperture extending through the valve between the first and second surfaces; and
    a tube including an undeformed end portion terminating at an annular edge, the end portion penetrating the first surface and extending through the aperture, and the end portion being deformed to engage the second surface.

2. The connection according to claim 1, wherein the tube further includes a flange contiguously engaging the first surface.

3. The connection according to claim 1, wherein the second surface is cylindrical.

4. The connection according to claim 3, wherein an intersection of the aperture and the second surfaces is configured as a saddle, and the end portion extends through the saddle.

5. The connection according to claim 4, wherein the end portion includes a deformation aligned with a minor axis of the saddle.

6. The connection according to claim 4, wherein the aperture includes a taper and the saddle includes a chamfer.

7. The connection according to claim 1, wherein the end portion includes at least one deformation.

8. The connection according to claim 7, wherein the end portion includes four deformations.

9. The connection according to claim 8, wherein the tube includes a central longitudinal axis, and the four deformations are distributed at equiangular intervals around the axis.

10. A connection for communicating exhaust gas, the connection comprising:
    an exhaust gas recirculation valve assembly having an exterior surface and an interior surface defining a cavity, and having an aperture extending between the interior and exterior surfaces; and
    a differential pressure tube having an undeformed end portion terminating at an annular edge, the end portion penetrating the exterior surface, extending through the aperture, and being deformed so as to engage the interior surface.

11. The connection according to claim 10 wherein the interior surface of the cavity is generally cylindrical.

12. The connection according to claim 11, wherein an intersection of the aperture and the interior surface is configured as a saddle, the end portion extends through the saddle.

13. The connection according to claim 12, wherein the differential pressure tube also has a flange contiguously engaging the exterior surface, the end portion is deformed at two points aligned along a minor axis of the saddle, and at least one of the saddle, the aperture, and the second body includes a taper.

14. A method of connecting a tube to a valve, the tube including an undeformed end portion terminating at an annular edge, and the valve including a first surface, a second surface, and an aperture extending through the valve between the first and second surfaces, the method comprising:
    arranging the undeformed end portion and annular edge to penetrate the first surface and to extend through the aperture; and
    deforming the end portion to contiguously engage the second surface.

15. The method according to claim 14, wherein the deforming includes staking the edge to the second surface.

16. The method according to claim 15, wherein the staking includes deforming the edge with a cruciform tip tool.

17. The method according to claim 14, wherein an intersection of the aperture and the interior surface is configured as a saddle, the end portion extends through the saddle.

18. The method according to claim 17, wherein two stakes extend along a minor axis of the saddle.

19. The method according to claim 17, further comprising:
    tapering at least one of the saddle, the aperture, the first and second surfaces, and the tube.

* * * * *